United States Patent [19]

Hansen

[11] Patent Number: 4,698,173

[45] Date of Patent: Oct. 6, 1987

[54] DEICING COMPOSITIONS

[76] Inventor: Charles N. Hansen, 1448 S. 17th East, Salt Lake City, Utah 84108

[21] Appl. No.: 933,860

[22] Filed: Nov. 24, 1986

[51] Int. Cl.⁴ .............................................. C09K 3/18
[52] U.S. Cl. ...................................... 252/70; 71/30; 71/64.12; 71/113; 252/385; 562/555
[58] Field of Search ...................... 252/70, 385; 71/30, 71/64.12, 113; 562/555

[56] References Cited

U.S. PATENT DOCUMENTS

| | | | |
|---|---|---|---|
| 1,344,673 | 6/1920 | Bosch | 562/555 |
| 3,108,075 | 10/1963 | Hearst | 252/70 |
| 3,125,434 | 3/1964 | Smith et al. | 71/64.12 |

Primary Examiner—Robert A. Wax
Attorney, Agent, or Firm—Dowell & Dowell

[57] ABSTRACT

A deicing material which is not corrosive to reinforcing steel or aluminum in overpasses and bridges consists essentially of ammonium carbamate and may be combined with urea production by-products or certain alkalis.

11 Claims, No Drawings

DEICING COMPOSITIONS

BACKGROUND OF THE INVENTION

1. Field of the Invention

This invention relates to compositions and the methods for using them for removing snow or ice from concrete, reinforcing concrete, and ferrous or aluminum metal surfaces without producing corrosion of the metal or the breakup of the concrete from corroding metals in the concrete.

2. History of the Prior Art

Common salt, sodium chloride, is the major chemical used for deicing highways, bridge decks, overpasses and other paved surfaces. Calcium chloride is used for this purpose to a lesser extent. Sodium chloride has the advantage that it is less expensive. Calcium chloride costs several times as much as sodium chloride, but it can melt ice or snow at much lower temperatures and has an exothermic heat of solution. Since most snow storms that affect vehicular traffic occur at about 32 degrees F., and sodium chloride is effective at a substantially lower temperatures, the lower eutectic temperature and the exothermic heat of solution of calcium chloride is not as important as the lower cost of the salt.

Both salt and calcium chloride, because of their chloride content, have deleterious affects on any steel which is exposed to these chloride solutions. The contained chlorides also create the possibility of producing chloride toxicity in any plant life which is exposed to the solutions produced by the action of chloride type deicers.

When salt or calcium chloride is applied to reinforced concrete structures, severe corrosion of the steel is produced and as the reinforcing steel corrodes, the corrosion products created put a stress on the surrounding concrete to produce pot holes in the concrete. Thus, there is not only damage to the reinforcing steel but also to the concrete. Repairing this damage costs millions of dollars for some of the major highway structures. The corrosion produced on highway vehicles and on other steel structures, which are exposed to these chloride solutions, is recognized as significant.

As an example of the toxic affect of chloride salts on plant life, in the "Biological Abstracts" of Dec. 1, 1971, No. 130264 there is an abstract of an article by Aoki et al. giving the concentration of chlorides in the growing media which produces a toxic effect on some varieties of crytomeria japonica. To quote, "Some varieties grew poorly at Cl concentration of 0.06%. At 0.14% the dry weight increased but the plant wilted due to an excessive accumulation of NaCl toward the end of their growths."

Since salt and calcium chloride are so corrosive to metal, it is necessary to use other deicers for removing snow or ice from metal surfaces. As an example, propylene glycol solutions are used to flush the snow from airplanes just prior to take off. Even though propylene glycol is a comparatively expensive chemical, it has the advantage that it is not inherently corrosive to metal and any corrosion which might occur is eliminated by the addition of corrosion inhibitors.

In order to keep railway switches working freely, it is necessary to use deicers. These deicers can not be corrosive to steel.

With such a need for an inexpensive, noncorrosive, deicing composition, it is understandable that considerable expense is involved in looking for a chemical which is relatively inexpensive, noncorrosive to ferrous metals and aluminum, has a low order of toxicity to plants and does not damage concrete. In a publication titled, "Alternative Highway Deicing Chemicals" by Dr. Stanley A. Dunn and Dr. Roy H. Schenk of the Bjorksten Research Laboratories, Inc., and based on Federal Highway Administration Report No. FHWA-RD-78-67, a summary is made of the potential of deicing chemicals which might be used to replace salt or calcium chloride as noncorrosive deicing chemicals along with the advantages and disadvantages each chemical might have. Following is a list of the chemicals suggested: sodium bicarbonate-sodium carbonate, sodium monohydrogen phosphate-sodium dihydrogen phosphate, potassium bicarbonate-potassium carbonate, potassium monohydrogen phosphate-potassium dihydrogen phosphate, tetrapotassium pyrophosphate, ammonium monohydrogen phosphate-ammonium dihydrogen phosphate, ammonium bicarbonate-ammonium carbonate, various organic compounds, such as, alcohols (methanol, ethanol, isopropanol), carboxylic acids, di-carboxylic acids, amides (urea or formamide), ketones (acetone), aldehydes, amines, ammonium carbonate, dimethyl sulfoxide, and metal organic salts (calcium and magnesium acetate). In this list, the article suggests that the most promising deicing candidates are methanol and calcium magnesium acetate (abbreviated as CMA).

Research has been performed and reported on the effect that chlorides have on the corrosion of steel and of reinforcing steel in concrete. Among these publications are the following: "Corrosion of Reinforcing Bars in Concrete" by Mozer, Bianchini and Kesler in the August 1965 issue of Journal of American Concrete Institute; "Corrosion of Reinforcing Steel" by Tremper; ASTM Special Technical Publication No. 169-A, "Significance of Tests and Properties of Concrete and Concrete Making Materials", "Concrete Variables and Corrosion Testing" by Spellman and Stratful, State of California, Department of Public Works, Division of Highways, Materials and Research Department, Research Report No. M & R 635116-6, FHWA D-3-11; "A Rapid Method of Studying Corrosion Inhibition of Steel in Concrete" by Gouda and Monfore, Journal of PCA Research and Development Laboratories, Ser. 1175, September, 1965.

A review of these publications appears to indicate the following: Concrete, itself, acts as an inhibitor to corrosion of the contained reinforcing steel. The corrosion of steel in concrete may be chemical but more commonly it is electrochemical in nature. The area where metal ions go into solution becomes the anodic region. If the metal is iron, the iron, as it goes into solution, forms ferrous ions, $Fe++$ plus two electrons, $2e-$. To maintain an equilibrium of electrical charges, an equivalent quantity of hydrogen is plated out at adjacent surfaces of the metal, the cathode. This thin film of hydrogen inhibits further corrosion unless the hydrogen film is removed in some manner. The anodic and cathodic reactions are represented as follows:

anodic $Fe \rightarrow Fe++ +2e-$  (1)

cathodic $2H+ +2e- \rightarrow H_2$  (2)

The reaction taking place at the cathode area is slow in alkaline media because the concentration of hydrogen is very low but is accelerated by the depolarizing action of dissolved oxygen.

$$2H^+ + \tfrac{1}{2}O_2 + 2e \rightarrow H_2) \quad (3)$$

$$Fe + H_2O + \tfrac{1}{2}O_2 \rightarrow Fe(OH)_2 \quad (4)$$

The corrosion rate is proportional to the oxygen concentration. The quantity of electricity flowing through the local cells is equivalent to the amount of metallic corrosion. With increasing anodic polarization, the overall corrosion of metal diminishes. In ordinary conditions of reinforcing steel in concrete, where pH is high and the hydrogen concentration is low and where the oxygen supply is virtually non-existent, an anodic coating builds up on the steel to stop the corrosion. When chloride deicing salts are used the protective, anodic, iron oxide and hydrogen films are removed by forming the soluble chloride compounds and thus leaving the iron or steel open to further electrochemical attack.

Gouda and Monfore made the following statement, "Since areas that corrode are anodic, valuable information may be obtained on a macroscopic scale by forcing the whole metal to be anodic. This can be accomplished by applying an external voltage between the metal as an anode and an auxilary electrode as cathode. Polarization current densities of from 1 to 1000 micro-amperes per sq. cm. are usually applied in such tests, presumably approximating the values encountered in actual local cells." The tests used in evaluating the corrosive action of various chemicals in the present application are based upon a modified version of the foregoing procedure used by Gouda and Monfore.

Metal which is above hydrogen in the emf series, such as iron or aluminum, may corrode quite readily when not imbedded in concrete, as it may be exposed to either oxygen or to hydrogen ions; although, aluminum forms an aluminum oxide coating which resists oxygen corrosion but is subject to hydrogen ion corrosion. Of course water, in the open atmosphere, will corrode iron or steel. Aluminum is also subject to corrosion from strong hydroxide solutions.

Urea has been used as a deicing compound. It is not considered to be as corrosive to ferrous metal as the chloride deicing salts and it is not as toxic to plants. Urea has the disadvantage of having a relatively high eutectic temperature in a water solution, that is, 11.3 degrees F. at a concentration in water of 32.5 percent. It also takes about 2.2 times as much urea to produce a urea solution in water, 5.5 percent, that has the same freezing point as a 2.5 percent solution of sodium chloride in water.

The eutectic temperature of common salt, sodium chloride, is −6 degrees F. It is recognized in the art of removing snow or ice from highways that a temperature difference of about 20 degrees F. between the eutectic temperature of a deicing composition in water and the air temperature is needed to melt the snow or ice. For example, the salt in water eutectic temperature of −6 degrees F. plus the 20 degree difference is equal to an air temperature of 14 degrees F. To quote from the "Snow Fighter's Handbook" from the Utah State Department of Transportation, "Remember—watch your thermometer and treat the snow accumlation accordingly. When it is 15 degrees F. or lower, forget the salting. It is too cold for it to have any noticeable effect. Use sand or other abrasive . . . "

The eutectic temperature of urea, ammonium carbonate and anmonium bicarbonate are 11.3, 5.7, and 14.9 degrees F., respectively. By adding 20 degrees to these temperatures, the practical deicing temperatures of these compounds is 31.3, 25.7 and 34.9 degrees F., respectively, and only the ammonium carbonate appears to have much value when the air temperature is much below 32 degrees.

In deicing highways, the "Snow Fighter's Handbook" for the State of Utah suggests that the deicing salt should be applied to the highway "When the ground is barely white and is wet enough to hold the salt on the roadbed." For Type 1 service, the handbook recommends applying the "straight salt at the rate of 0.24 cubic yards per two land mile." The lanes are considered to be twelve feet wide. If one fourth cubic yard of salt is estimated to weigh 450 pounds, if it is assumed that when the ground is "barely white", there is one fourth inch of snow, and if it is assumed that ten inches of snow is equivalent to one inch of water, the most concentrated brine that would be formed under the described highway practice would be a solution that contained about 2.7 percent sodium chloride. This is equivalent to 0.00355 pounds of salt per 0.1299 pounds of water per square foot of surface or 0.032 pounds of salt per square yard of surface.

Ice or packed snow becomes slick whenever a film of water forms on the surface. This film of water ordinarily forms because ice turns to water when it is put under pressure. The blade of an ice skate is a small surface area. The weight of a person presses down with a high pressure on this small surface area, causes the ice to melt, forms a thin film of water under the ice skate and allows a person to glide over the ice on a thin film of water. A several thousand pound automobile presses down on the relatively small area of four tires and slides on the water film formed on the surface of the ice.

Because of this principle, it is the practice to use granular or crystalline deicing particles to remove snow or ice from paved surfaces. If liquids were used, there is the danger of forming a film of water on the surface of the ice and of producing a hazardous slippery condition. When granular or crystalline particles of deicer are broadcast over the surface, they bore through the ice, spread a solution under the ice to loosen it from the pavement and allow the ice to be mechanically removed without having to dissolve all the ice or to leave a dangerous liquid film on the surface of the ice.

The main usage of liquid deicers is to remove the snow or ice completely from the surface. This requires many times as much deicer but it has the advantage of rapidly removing the snow or ice from the surface. Such practice is used on limited surface areas, such as to remove snow from the surface of an aircraft prior to take-off. This removes the snow without the danger of damaging the surface of the aircraft with a mechanical scraping device.

The U.S. Pat. No. 3,108,075 to Hearst, reviews the freezing points and corrosive effects of numerous organic compounds, including ammonium carbamate, and concludes that predominantly formamide mixtures are best. Hearst purported to investigate all likely materials (col. 5, lines 3–7), including ammonium carbamate, for their rates of ice melting but found, from his experiments, that "the most promising materials were formamide, ethylene glycol, and ammonium acetate." (Col. 5, lines 53–56). Hearst thus failed to recognize superior characteristics of ammonium carbamate and lead the art away from its use, apart from formamide.

SUMMARY OF THE INVENTION

A superior deicing composition is one which does not corrode ferrous metals or aluminum, has a freezing temperature which melts ice or snow down to at least −7 degrees C. or 20 degrees F., the lowest practical working temperature of salt, is not toxic to plant life, is nonflammable, is competitive in its usage cost to salt when applied to pavements and to glycol solutions for deicing metal surfaces, is a solid when used to remove ice or snow from pavements and a liquid when used to flush ice or snow from metal surfaces.

It is an object of this invention to provide deicing compositions which meet the foregoing criteria.

Another object of the invention is to provide ammonium carbamate compositions which do not corrode aluminum or ferrous metals, iron or steel, when they are imbedded in concrete or when they are not surrounded by the protecting environment of concrete.

Another object of this invention is to provide ammonium carbamate compositions, which form a eutectic in a water solution of about −20 degrees F. or −29 degrees C., and in which a 2.5 percent solution in water has a freezing temperature of about 29.7 degrees F. or −2.3 degrees C. These freezing temperatures compare most favorably with the eutectic of common salt, sodium chloride, solution which has a eutectic temperature of −6 degrees F. or −21 degrees C. The freezing temperature of a 2.5 percent solution in water compares most favorably with the freezing temperatures of a 2.5 percent solution of either sodium or calcium chloride which have freezing temperatures of 29.7 degrees F. or 31 2.3 degrees C., and 30.5 degrees F. or −1.5 degrees C., respectively. This makes it possible to use these ammonium carbamate compositions at temperatures that are 14 degrees F. below the temperatures at which sodium chloride can be used. At the highway usage rate of 450 pounds per two lane mile, on pavements that are barely white with snow, the ammonium carbamate compositions are capable of melting as much snow as sodium chloride and considerably more snow than calcium chloride.

Since ammonium carbamate is classed as a fertilizer, another object of the invention is to provide deicing compositions based upon ammonium carbamate which are not toxic to plant life.

A further object of the invention is to provide deicing compositions which are economical to use. Even though ammonium carbamate is not commercially manufactured, at the present time, it can be produced by reacting carbon dioxide with ammonia, both of which are available in commerce and both of which are relatively inexpensive. The chemistry of reacting carbon dioxide with ammonia to form ammonium carbamate, is well known. A potential method of producing ammonium carbamate is to process an intermediate product in a urea plant, that is, to remove that part of the ammonium carbamate which is not converted to urea. This would eliminate the necessity of recycling the unconverted ammonium carbamate and, as a result, increase the total production of the plant. This increased production, potentially reduces the cost of producing urea and ammonium carbamate, such that the potential cost of ammonium carbamate is at least as low as the present cost of urea.

In a urea producing plant, as an example, in which urea is typically synthesized from ammonia and carbon dioxide, there are two main reactions, the formation of ammonium carbamate, and the conversion of ammonium carbamate into urea. The reactions may be represented by the following:

$$CO_2 + 2NH_3 \rightarrow NH_2CO_2NH_4 \tag{1}$$

$$NH_2CO_2NH_4 \rightarrow NH_2CONH_2 + H_2O \tag{2}$$

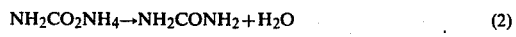

The reaction of equation (1) typically involves the formulation of carbonates of ammonia if water is present. In the reaction represented by equation (2), the dehydration is not complete and material not converted into urea is recirculated through the reactor. In accordance with the present invention, it is contemplated that in such a urea plant a stream of ammonium carbamate would be taken from the first absorber, in which the unconverted ammonia and carbon dioxide are received, and chilled in a water solution saturated with ammonia to form either prills or crystals of ammonium carbamate containing whatever impurities of urea in ammonium carbonate result from chilling such mixture. This method of production would increase the urea output of the plant and at the same time result in relatively low cost ammonium carbamate. Alternatively, ammonium carbamate could be produced directly from carbon dioxide and ammonia and taken directly from the reactor. Herein, such facility would require substantial capital investment whereas the investment required for taking the ammonium carbamate from the urea plant, as described above, would be relatively minor.

By eliminating the potential corrosion to the metal found in bridge decks, overpasses, reinforced concrete structures and to the vehicles passing over these structures, as well as the potential breakup of the concrete in these structures, the potential is great that the ammonium carbamate compositions will be much more economical to use than common salt with its attendant problems.

A forty percent solution of ammonium carbamate in water has a freezing temperature of about −20 degrees F. A forty-eight percent solution of propylene glycol in water has a freezing temperature of about −20 degrees F. A forty-eight percent solution of propylene glycol in water costs several times as much as the potential cost of a forty percent solution of ammonium carbamate in water. Ammonium carbamate compositions are potential deicers for flushing snow or ice from iron, steel, or aluminum surfaces.

A further object of the invention is to provide compositions which have a physical form suitable to the deicing application. For deicing highways, bridge decks, overpasses, and other paved surfaces, a solid granular form is supplied. When the ice or snow needs to be immediately removed, such as from the wings of an airplane, a deicing solution is supplied.

DETAILED DESCRIPTION OF THE INVENTION

Introduction

One of the major problems of highway maintenance has been the corrosion that occurs in bridge decks, overpasses and other reinforced concrete structures. The magnitude of this problem has been increased as the interstate freeways have been completed with the increased number of reinforced concrete structures. Probably the major factor in producing this corrosion is the use of common salt, sodium chloride, as a chemical to help in keeping these freeways from ice and snow and thus to reduce the hazards of slick highways which might result in serious injury to people or the loss of their lives. The cost of trying to prevent such corrosion and of repairing the damage caused by it is extensive for each major freeway interchange and large sums have been spent in a search for a deicing composition which would not be corrosive to ferrous metals or aluminum, which would be economical to use, and which would not injure plant life.

This invention relates to the use of various compositions which contain ammonium carbamate as a reagent which fulfills the above requirements. In order to show that these deicing compositions, which contain ammonium carbamate, fulfill these requirements, it was necessary to run several series of tests. One of these series of tests shows the freezing or melting characteristics of these compositions. A second series of tests shows that these compositions do not corrode steel or aluminum. A third series of tests shows that these compositions do not corrode the reinforcing steel in concrete.

Ammonium Carbamate Structure and Availabilty

Ammonium carbamate has a gram formula weight of 78 and it is uncertain as to whether or not the molecule breaks up into more than one molecular or ionic piece when added to water. The chemical is not commercially available, even from the reagent supply companies. If it were available, it would probably cost more than one dollar per pound. On this basis, the 'R' value of ammonium carbamate, as calculated from the formula found on page 262 of "Alternative Highway Deicing Chemicals" by Dunn and Schenk, referred to above, is as follows: where M = molecular weight of the candidate
C = cost of the candidate = $1.00 per pound (estimate)
N = number of particles or ions into which a molecule of the candidate breaks up upon going into solution = 1 or 2
Subscript o = the same quantities for NaCl
For $N=1$, $R=(MC/N)\times(No/MoCo)=(78/1)\times(2/0.01\times58.5)=267$
For $N=2$, $R=133$ Dunn et al. suggests that any clear deicier chemical having an "R" value of 20 or more should be eliminated as a cost effective potential deicing chemical.

Even though there is apparently no commercial production of ammonium carbamate, of which I am aware, it is an intermedite product in the commerical production of urea and a description of its physical and chemical properties is found in the technical literature which is primarily written about the production of urea. Some of the technical publications are as follows: "Urea—Its Properties and Manufacture", 1967, Library of Congress No. 78-3093 George Tsei-yu Chao; "Basic Theory: The Industrial Synthesis of Urea" by Frejacques from "Chemie et Industrie"; Volume 60 #1, July 1948, "Inorganic and Theoretical Chemistry" section on carbamic acid and carbamates.

Freezing Characteristics

The freezing tests were run in a Dewar Vacuum Flask, according to the design shown on page 137 of "Experiments in Physical Chemistry", 1967, McGraw Hill, Library of Congress No. 67-11880 Second Edition, by Shoemaker and Garland, except the freezing mixture used was dry ice and ethanol, which produces a temperature of $-72$ degrees C. or $-97.6$ degrees F. and the thermometer could be read to only 0.1 degrees F. (Since the tests did not require a greater accuracy than the closest 0.1 degrees F., it was not necessary to use a more accurate thermometer.) A freezing mixture of calcium chloride and ice was tried but the test results were not reliable as the temperature difference between the solution being frozen and the freezing mixture did not appear to be large enough to produce a constant rate of temperature reduction of the solution being frozen. As the tests were run, the thermometer was checked for accuracy against the freezing temperature of distilled water.

Before running these tests, it was decided that ammonium carbamate would be the main chemical for which the freezing temperature should be determined. Since a urea manufacturing plant could possibly be the most economical source of anmonium carbamate and since urea, ammonium carbonate or ammonium bicarbonate might be found in the ammonium carbamate produced in a urea plant, it was decided that the freezing characteristics of these reagents would also need to be determined. It was also decided that the effect of various alkalis in combination with these chemicals should be tested, as positive additives.

Among the early tests were Tests No. 5-20AD1, D2, D3 and D4, shown in Example No. 1, containing 2.5, 5.0, 10.0 and 20.0 percent ammonium carbamate, respectively. These tests revealed an interesting reduction in the freezing temperature with the increasing concentration of ammonium carbamate as well as a freezing temperature of 29.7 degrees F., at the highway usage rate of 2.5%, that was as low as the freezing temperature of a 2.5% salt solution, and lower than the freezing temperature of a 2.5% calcium chloride solution, 30.5 degrees F.

EXAMPLE NO. 1

| Test No. | Ammonium Carbamate | | Water | | Freezing Temp. °F. |
| | % of solids | % of Solution | % of Solids | % of Solution | % of Solids | % of Solution | |
|---|---|---|---|---|---|---|---|
| 5-29AD1 | 100.0 | 2.5 | | | | 97.5 | 29.7 |
| 5-29AD2 | 100.0 | 5.0 | | | | 95.0 | 28.0 |
| 5-29AD3 | 100.0 | 10.0 | | | | 90.0 | 23.1 |
| 5-29AD4 | 100.0 | 20.0 | | | | 80.0 | 12.1 |

A comparable series, Example No. 2, using a composition that contained one mole of sodium hydroxide per mole of ammonium carbumate or 66% ammonium carbamate carbamate/and 34 percent sodium hydroxide, showed that this composition had, for concentrations in water of 5.0 10.0 and 20.0 percent, Tests No. 5-29E2, E3, and E4, respectively, lower freezing temperatures than the ammonium carbamate solutions of the same concentrations.

EXAMPLE NO. 2

| Test No. | Ammonium Carbamate % of Solids | Ammonium Carbamate % of Solution | Sodium Hydroxide % of Solids | Sodium Hydroxide % of Solution | Water % of Solids | Water % of Solution | Freezing Temp. °F. |
|---|---|---|---|---|---|---|---|
| 5-29E1 | 66.0 | 1.65 | 34.0 | 0.85 | | 97.5 | 29.9 |
| 5-29E2 | 66.0 | 3.30 | 34.0 | 1.70 | | 95.0 | 27.1 |
| 5-29E3 | 66.0 | 6.60 | 34.0 | 3.40 | | 90.0 | 22.8 |
| 5-29E4 | 66.0 | 13.20 | 34.0 | 6.80 | | 80.0 | 10.3 |

Another surprising result, Example No. 3, was in the addition of one mole of sodium orthosilicate to one mole of ammonium carbamate or 70.2% sodium orthosilicate with 29.8% ammonium carbamate, Tests No. 11-16A Nos. 6 through 10. This composition produced freezing points that were close to the freezing points of both the two preceding tests; although, the pH of these solutions are probably too high to be of practical value.

EXAMPLE NO. 3

| Test No. | Ammonium Carbamate % of Solids | Ammonium Carbamate % of Solution | Sodium Orthosilicate % of Solids | Sodium Orthosilicate % of Solution | Water % of Solution | pH | Freezing Temp. °F. |
|---|---|---|---|---|---|---|---|
| 11-16A6 | 29.8 | 0.75 | 70.2 | 1.76 | 97.5 | 12.68 | 30.0 |
| 11-16A7 | 29.8 | 1.49 | 70.2 | 3.51 | 95.0 | 13.27 | 27.9 |
| 11-16A8 | 29.8 | 2.98 | 70.2 | 7.02 | 90.0 | 13.57 | 23.2 |
| 11-16A9 | 29.8 | 5.96 | 70.2 | 14.04 | 80.0 | 13.78 | 10.0 |
| 11-16A10 | 29.8 | 7.75 | 70.2 | 18.25 | 74.0 | 13.42 | 2.0 |

An average analysis of the 'hot solution' above 210 degrees F., from the first column of the Wycon Chemical Company's urea Production plant was obtained. Following is that analysis: $NH_3$, 42%; $CO_2$ 29%; urea, 3%, $H_2O$, 26%. These chemicals are in the form of ammonium carbamate, urea and/ammonium carbonate compounds with free gas and steam. With such an analysis, the percent of either ammonium carbamate or of ammonium carbonate is limited by the percentage of carbon dioxide, since there are fewer moles of carbon dioxide than of ammonia. If all the carbon dioxide were in the form of ammonium carbonate, the empirical formula would be as follows:

| Ammonium carbonate | 63.3 |
|---|---|
| XS NH3 | 19.6 |
| Urea | 3.0 |
| XS H2O | 14.1 |

If all the water and ammonia were removed to leave only the ammonium carbonate plus urea, the solid, portion would be as follows:

| | Parts | Percent |
|---|---|---|
| Ammonium carbonate | 63.3 | 95.5 |
| Urea | 3.0 | 4.5 |
| Total | 66.3 | 100.0 |

If all the carbon dioxide were in the form of ammonium carbamate, and the literature indicates that most of the product would be ammonium carbamate, the empirical formula would be as follows:

| Ammonium carbamate | 51.4 |
|---|---|
| XS Ammonia | 19.6 |
| Urea | 3.0 |
| XS H2O | 26.0 |

If all the water and ammonia were removed to leave only the ammonium carbamate plus urea, the solid portion would be as follows:

| | Parts | Percent |
|---|---|---|
| Ammonium carbamate | 51.4 | 94.5 |
| Urea | 3.0 | 5.5 |
| Total | 54.4 | 100.0 |

In view of these calculations, a series of freezing tests were run at a concentration of 2.5 percent of the various compositions in water and in which the urea was about 5.2% to 20.0% of the contained urea plus ammonium carbamate. These compositions were then combined with various concentrations of sodium and potassium hydroxide and the freezing temperatures were determined. The freezing temperature of a 2.5% sodium chloride solution was also shown. These tests were designated as 1-15B1 through 1-15B4 and are found in Examples No. 4 through 9.

Example No. 4 shows that ammonium carbamate with no urea added, has the lowest freezing temperature and as the proportion of urea was increased, the freezing temperature increased and the pH of the solution decreased.

EXAMPLE NO. 4

An example of the effect that the addition of urea has on the freezing temperatures of ammonium carbamate in water solutions.

| Test No. | Ammonium Carbamate % of Solids | Ammonium Carbamate % of Solution | Urea % of Solids | Urea % of Solution | Water % of Solution | pH | Freezing Temp. °F. |
|---|---|---|---|---|---|---|---|
| 1-15B1 | 94.8 | 2.37 | 5.2 | 0.13 | 97.5 | 9.67 | 29.7 |
| 1-15B10 | 90.0 | 2.25 | 10.0 | 0.25 | 97.5 | 9.30 | 29.8 |

-continued

| Test No. | Ammonium Carbamate % of Solids | Ammonium Carbamate % of Solution | Urea % of Solids | Urea % of Solution | Water % of Solution | pH | Freezing Temp. °F. |
|---|---|---|---|---|---|---|---|
| 1-15B12 | 80.0 | 2.00 | 20.0 | 0.50 | 97.5 | 9.30 | 29.9 |

Comparing 1-15B11 of Example No. 5 with 1-15B1 of Example No. 4, each contained the same percentage of urea, but in 1-15B11 about half of the ammonium carbamate had been replaced with sodium hydroxide, such that, there was about two moles of sodium hydroxide per mole of ammonium carbamate and the freezing temperature of the solution had increased from 29.7 to 29.9 degrees F. In Example No. 5, Test No. 1-15B4, the urea content in the deicer composition was about 5.5% of the ammonium carbamate plus urea content plus two moles of sodium hydroxide per mole of ammonium carbamate. In Test No. 1-15B6, there was a urea content that was 5.4 percent of the ammonium carbamate plus urea content, but only one mole of sodium hydroxide per mole of ammonium carbamate. The urea content of the composition in Test No. 1-15B11 was 10.0% of the ammonium carbamate plus urea content and again had two moles of sodium hydroxide per mole of carbamate. It was surprising that a 2.5% solution of each of these compositions had the same freezing temperature, that is, 29.9 degrees F.

EXAMPLE NO. 5

An example of the effect that the addition of sodium hydroxide has on the freezing temperature of a composition containing ammonium carbamate plus urea.

| Test No. | Ammonium Carbamate % of Solids | Ammonium Carbamate % of Solution | Urea % of Solids | Urea % of Solution | Sodium Hydroxide % of Solids | Sodium Hydroxide % of Solution | Freezing Temp. °F. |
|---|---|---|---|---|---|---|---|
| 1-15B4 | 48.0 | 1.20 | 2.8 | 0.07 | 49.2 | 1.23 | 29.9 |
| 1-15B6 | 63.6 | 1.59 | 3.6 | 0.09 | 32.8 | 0.82 | 29.9 |
| 1-15B11 | 46.8 | 1.17 | 5.2 | 0.13 | 48.0 | 1.20 | 29.9 |

The pH of these three solutions was 11.18, 10.18 and 11.35, respectively. The pH appeared to be very much a function of the concentration of sodium hydroxide. All of the solutions contained 2.5% solids and they all had the same freezing temperature.

In Test No. 1-15B8 of Example No. 6, the urea content of the composition was equal to 5.7% of the ammonium carbamate plus urea content and there was about two moles of potassium hydroxide per mole of ammonium carbamate. When compared with Test No. 1-15B4 of Example No. 5, which had about the same urea content and the same mole ratio of alkali to ammonium carbamate, it is surprising that the sodium hydroxide in Test No. 1-15B4 produced a lower freezing temperature than did the potassium hydroxide in Test No. 1-15B8.

EXAMPLE NO. 6

An example of the effect that the addition of two moles of potassium hydroxide per mole of ammonium carbamate has on the freezing temperature of an ammonium carbamate plus urea composition in water.

| Test No. | Ammonium Carbamate % of Solids | Ammonium Carbamate % of Solution | Urea % of Solids | Urea % of Solution | Potassium Hydroxide % of Solids | Potassium Hydroxide % of Solution | Freezing Temp. °F. |
|---|---|---|---|---|---|---|---|
| 1-15B8 | 40.0 | 1.00 | 2.4 | 0.06 | 57.6 | 1.44 | 30.4 |

Note that in comparing this test with 1-15B4 of Example No. 5 which was also a 2.5% solution of solids in water and which had two moles of sodium hydroxide per mole of ammonium carbamate, the potassium hydroxide produced a higher pH, 11.92 as compared with 11.18 and a higher freezing point, 30.4° F. as compared with 29.9° F.

The urea content in 1-15B2 of Example No. 7 was about the same as the urea content in 1-15B1 of Example No. 4 and the urea content in 1-15B13 was the same as in 1-15B10, but 1-15B1 and 1-15B10 contained ammonium carbamate while 1-15B2 and 1-15B13 contained ammonium carbonate. The ammonium carbamate compositions produced the lower freezing temperatures when compared with the ammonium carbonate compositions.

EXAMPLE NO. 7

An example of the freezing temperatures of a 2.5% solution in water of ammonium carbonate and urea compositions.

| Test No. | Ammonium Carbonate % of Solids | Ammonium Carbonate % of Solution | Urea % of Solids | Urea % of Solution | Water % of Solution | pH | Freezing Temp. °F. |
|---|---|---|---|---|---|---|---|
| 1-15B2 | 94.4 | 2.36 | 5.6 | 0.14 | 97.5 | 9.23 | 30.2 |
| 1-15B13 | 90.0 | 2.25 | 10.0 | 0.25 | 97.5 | 9.14 | 30.3 |

The urea and the sodium hydroxide content in Test No. 1-15B3 of Example No. 8 was about the same as the urea and sodium hydroxide content in Test No. 1-15B4 of Example No. 4 and the urea and sodium hydroxide content in Test No. 1-15B5, of Example No. 8, was about the same as the urea and sodium hydroxide content in Test No. 1-15B6 of Example No. 5, but the freezing temperatures of the compositions in Example No. 8, with ammonium carbonate, were higher than the comparable tests in Examples No. 4 and 5 with ammonium carbamate.

EXAMPLE NO. 8

An example of the freezing temperatures produced by 2.5% solutions in water of compositions containing one and two moles of sodium hydroxide per mole of ammonium carbonate with urea equal to about 5.5% of the total ammonium carbonate plus urea in the composition.

|  | Ammonium Carbonate | | Urea | | Sodium Hydroxide | | |
| --- | --- | --- | --- | --- | --- | --- | --- |
| Test No. | % of Solids | % of Solution | % of Solids | % of Solution | % of Solids | % of Solution | Freezing Temp °F. |
| 1-15B3 | 49.6 | 1.24 | 2.8 | 0.07 | 48.0 | 1.2 | 30.1 |
| 1-15B5 | 65.2 | 1.63 | 3.5 | 0.09 | 31.6 | 0.79 | 30.2 |

The pH of the above solutions were 11.2 and 9.86, respectively.

Test No. 1-15B7 of Example No. 9 had about the same urea and potassium hydroxide content as Test No. 1-15B8 of Example No. 6. The ammonium carbamate composition in 1-15B8 produced a lower freezing temperature than the ammonium carbonate compositions of 1-15B7.

It is evident, from these tests, that ammonium carbamate has more desirable freezing characteristics than does ammonium carbonate. It is also evident that sodium hydroxide, when combined with either ammonium carbamate or with ammonium carbonate, will produce solutions with lower freezing temperatures than potassium hydroxide.

EXAMPLE NO. 9

An example of the freezing temperature produced by a composition of about two moles of potassium hydroxide per mole of ammonium carbonate with the urea equal to about 5.5% and 10% of the total of the urea and ammonium carbonate in the composition.

|  | Ammonium Carbonate | | Urea | | Potassium Hydroxide | | |
| --- | --- | --- | --- | --- | --- | --- | --- |
| Test No. | % of Solids | % of Solution | % of Solids | % of Solution | % of Solids | % of Solution | Freezing Temp. °F. |
| 1-15B7 | 41.6 | 1.04 | 2.4 | 0.06 | 56.4 | 1.41 | 30.7 |
| 1-15B14 | 40.8 | 1.02 | 4.4 | 0.11 | 54.8 | 1.37 | 30.6 |

In comparing Test No. 1-15B7 and 1-15B14 of this test with 1-15B3 of Example No. 8, the compositions containing the sodium hydroxide have the lower freezing temperatures.

The pH of the above solutions were 10.65 and 10.54, respectively.

Example No. 10 shows the freezing characteristics of the various compositions of ammonium carbamate and/or urea in water. This data shows that there is no ternary eutectic. The lowest freezing temperature, −20 degrees F., was produced with the binary composition of 40% ammonium carbamate and 60% water, Test No. 2-16C1. As the percentage of water or urea was added to this composition, the freezing temperature increased. A 25% ammonium carbamate solution in water, has about the same freezing temperature, 11.5 degrees F., Test No. 1-22C1, as the eutectic composition of 32.5% urea in water, 11.3 degrees F. As the percentage of urea is increased, the freezing temperature increases, but even when 25% of the solids is urea and 75% is ammonium carbamate in a solution containing 62.2% water and 37.8% solids, a relatively low freezing temperature of −11.7 degrees F. was produced, Test No. 2-21C2. The eutectic of the binary composition appears to be between 40 and 42 percent ammonium carbamate.

EXAMPLE NO. 10

An example of the freezing temperatures produced by the ternary of ammonium carbamate, urea and water.

|  | Ammonium Carbamate | | Urea | | | |
| --- | --- | --- | --- | --- | --- | --- |
| Test No. | % of Solids | % of Solution | % of Solids | % of Solution | Water % of Solution | Freezing Temp. °F. |
| 2-19C9 | 25.0 | 5.0 | 75.0 | 15.0 | 80.0 | 18.0 |
| 2-22C1 | 25.0 | 6.25 | 75.0 | 18.75 | 75.0 | 14.0 |
| 2-21C4 | 25.0 | 8.6 | 75.0 | 25.7 | 65.7 | 5.0 |
| 2-19C5 | 50.0 | 1.25 | 50.0 | 1.25 | 97.5 | 30.0 |
| 2-19C6 | 50.0 | 2.5 | 50.0 | 2.5 | 95.0 | 28.1 |
| 2-21C1 | 50.0 | 5.0 | 50.0 | 5.0 | 90.0 | 24.5 |
| 2-19C8 | 50.0 | 10.0 | 50.0 | 10.0 | 80.0 | 16.1 |
| 1-22C3 | 50.0 | 12.5 | 50.0 | 12.5 | 75.0 | 12.1 |
| 2-14C2 | 50.0 | 14.0 | 50.0 | 14.0 | 72.0 | 7.5 |
| 2-21C3 | 50.0 | 18.0 | 50.0 | 18.0 | 64.0 | −2.7 |
| 2-19C7 | 75.0 | 15.0 | 25.0 | 5.0 | 80.0 | 14.4 |
| 1-22C2 | 75.0 | 18.75 | 25.0 | 6.25 | 75.0 | 11.9 |
| 2-14C1 | 75.0 | 21.0 | 25.0 | 7.0 | 72.0 | 4.1 |
| 2-21C2 | 75.0 | 28.35 | 25.0 | 9.45 | 62.2 | −11.7 |
| 2-14C3 | 81.25 | 26.0 | 18.75 | 6.0 | 68.0 | −2.7 |
| 2-14C4 | 87.5 | 28.0 | 12.5 | 4.0 | 68.0 | −3.9 |
| 2-14C5 | 93.75 | 30.0 | 6.25 | 2.0 | 68.0 | −4.8 |
| 2-19C1 | 100.0 | 2.5 |  |  | 97.5 | 29.7 |
| 2-19C2 | 100.0 | 5.0 |  |  | 95.0 | 27.7 |

-continued

| Test No. | Ammonium Carbamate % of Solids | Ammonium Carbamate % of Solution | Urea % of Solids | Urea % of Solution | Water % of Solution | Freezing Temp. °F. |
|---|---|---|---|---|---|---|
| 2-19C3 | 100.0 | 10.0 | | | 90.0 | 23.4 |
| 2-19C4 | 100.0 | 20.0 | | | 80.0 | 13.2 |
| 1-22C1 | 100.0 | 25.0 | | | 75.0 | 11.5 |
| 2-14C8 | 100.0 | 34.0 | | | 66.0 | −9.6 |
| 2-14C9 | 100.0 | 36.0 | | | 64.0 | −14.1 |
| 2-16C2 | 100.0 | 38.0 | | | 62.0 | −17.3 |
| 2-16C1 | 100.0 | 40.0 | | | 60.0 | −20.0 |
| 2-16C3 | 100.0 | 42.0 | | | 58.0 | 7.2 |
| | | | 100.0 | 2.5 | 97.5 | 31.1 |
| | | | 100.0 | 5.0 | 95.0 | 30.2 |
| | | | 100.0 | 10.0 | 90.0 | 27.1 |
| | | | 100.0 | 20.0 | 80.0 | 18.9 |
| | | | 100.0 | 25.0 | 75.0 | 15.3 |
| | | | 100.0 | 32.5 | 67.5 | 11.3 |

EXAMPLE NOS. 11 and 12

The Corrosion of Steel or Aluminum

Since as discussed under the Prior Art, a solution that contains about 2.7% of deicer is formed when a deicer is first applied to a highway and as more snow falls the solution is diluted even more, the corrosion tests were run at a concentration of 2.5% of the deicer composition in water.

The steel test pieces were approximately one inch square and had a thickness of about one-sixteenth of an inch. In order to prepare the pieces for test, they were sanded on all sides to produce a bright surface and the edges and corners were filed to produce rounded edges and corners. A 3/32 inch hole was drilled in the center of each piece about one-eighth of an inch from the edge. The pieces were then immersed in a solution of 1-1-1 trichloroethane to remove any foreign material which might be adhering to them. The test pieces were then air dried and weighed on a Mettler H 10 balance.

The aluminum test pieces had about the same dimensions as the steel test pieces and were treated in the same manner, except it was not necessary to sand the already bright aluminum surfaces. The aluminum test pieces were filed to produce rounded edges and corners and washed, using a nylon scrubbing pad to make sure the surfaces were clean, before drilling the pieces, immersing them in the solvent, air drying and weighing.

After weighing, a polyester thread was run through the hole in the test piece and each test piece was suspended in 150 grams of a 2.5% deicer solution in distilled water. The solution and test were contained in a $1\frac{7}{8}$ inch diameter and $4\frac{1}{4}$ inch high polystyrene vial that was closed with a polyethylene snap-on type cover. The containers were immersed, to the liquid level of the solution, in a Labline constant temperature bath, Serial No. 1378, and the solutions were maintained at 36 degrees C., 97 degrees F. Once each day, the test pieces were removed from the deicer solutions, observed, exposed to the oxygen in the air and again suspended in the deicer solutions.

On the eleventh day, when it appeared that a substantial amount of corrosion had occured to the test pieces in the more corrosive solutions, the test pieces were pulled from the solutions, the threads were removed, the test pieces were scrubbed with a nylon cleaning pad, rinsed in distilled water, dried, immersed in a 1-1-1 trichloroethane solvent, air dried and weighed. All weights were recorded.

The purpose of this method of corrosion testing was not to show small differences in corrosion rates, but to show whether corrosion would occur or not. It is estimated that the accuracy of the procedure was to about ±0.0005 grams or any final weight within about 0.0005 grams of the initial weight was considered to show no corrosion or since the weight of each steel test piece was about nine grams and each aluminum test piece was about 2.7 grams, a percentage weight loss or gain of $(0.0005 \times 100/9 = 0.0056\%$ for steel or $(0.0005 \times 100/2.7 = 0.0185\%$ for aluminum would show no corrosion.

Corrosive Effect of Sodium Chloride, Calcium Chlorine or Urea on Steel.

Tests 10-14A numbers 3, 5, 7, 10, 12 and 14 showed that a solution of either sodium chloride, calcium chloride or urea would corrode steel. The amount of corrosion produced by each was approximately equal and it was decided that on subsequent tests, a 2.5% urea solution would be used as the standard to which the noncorroding solutions would be compared.

Noncorroding Effect of Ammonium Carbamate

Test Nos. 10-14A1 and 10-14A8 demonstrated that ammonium carbamate does not corrode steel.

Test No. 2-25C7 demonstrated that ammonium carbamate does not corrode aluminum.

Noncorroding Effect of Ammonium Carbamate Plus Urea.

Tests 1-28B Nos. 10 through 16 and tests 2-25C Nos. 1 through 6 and Test No. 3-9C5 along with Nos. 10-14A1 and 10-14A8 showed that a deicer solution made from 100% ammonium carbamate with 0.0% urea through 4% ammonium carbamate with 96% urea was not corrosive to steel. Tests 3-9C Nos. 1 through 4, showed that as the ammonium carbamate in the deicer composition is decreased from 3 to 0 percent, the amount of corrosion produced by the urea, as it was increased from 97% to 100% increased progressively.

Tests 2-25C Nos. 7, 8, 9, 11, 12 and 13 showed that a solution made from deicers containing 100% ammonium carbamate and 0% urea to 0% ammonium carbamate and 100% urea do not corrode aluminum.

Noncorroding Effect of Ammonium Carbonate

Test Nos. 10-14A4 and 10-14A11 showed that an ammonium carbonate solution does not corrode steel.

Noncorroding Effect of Ammonium Carbonate Plus Urea

Tests 1-28B Nos. 1 through 9 and Test Nos. 10-14A4 plus 10-14A11 showed that a deicer composed of 100% ammonium carbonate and 0% urea through 10% ammonium carbonate and 90% urea does not corrode steel.

Noncorroding Effect of the Addition of Alkali Salts, Such As, Sodium Hydroxide on Steel.

Tests 10-14A Nos. 2 or 9 compared with 1 or 8, showed that when one-third of the ammonium carbamate was replaced with sodium hydroxide there was no corrosion in either case. Tests 10-14A Nos. 6 or 13 compared with Nos. 4 or 11, showed that when 28% of the ammonium carbonate is replaced with sodium hydroxide, there was no corrosion in either case.

Noncorroding Effect of the Addition of Sodium Silicate to Ammonium Carbamate Plus Urea Test Nos. 2-25C10 and 2-25C14 showed that the addition of sodium silicate to a composition of ammonium carbamate plus urea does not corrode steel.

TABLE
Example No. 11
Corrosion of Deicing Solutions on Mild Steel.

| Test No. | Ammonium Carbonate % of Solids | Ammonium Carbonate % of Solution | Ammonium Carbamate % of Solids | Ammonium Carbamate % of Solution | Urea % of Solids | Urea % of Solution | % of Solids | % of Solution | NaCl % of Solution | CaCl$_2$ % of Solution | Percent Wt. Loss Loss (−) or Gain (+) | Percent of Weight Loss Saved as compared to | pH of Solution |
|---|---|---|---|---|---|---|---|---|---|---|---|---|---|
|  |  |  |  |  |  |  | Sodium Hydroxide |  |  |  |  |  |  |
| 1-28B1 |  |  |  |  | 100 | 2.5 |  |  |  |  | −0.230 | 0.0 | 1-28B1 | 6.98 |
| 2 |  |  | 10 | 0.25 | 90 | 2.25 |  |  |  |  | −0.003 | 98.7 | " | 9.08 |
| 3 |  |  | 20 | 0.50 | 80 | 2.00 |  |  |  |  | +0.001 | 100.4 | " | 9.16 |
| 4 |  |  | 30 | 0.75 | 70 | 1.75 |  |  |  |  | +0.002 | 100.9 | " | 9.23 |
| 5 |  |  | 40 | 1.00 | 60 | 1.50 |  |  |  |  | −0.002 | 99.1 | " | 9.23 |
| 6 |  |  | 50 | 1.25 | 50 | 1.25 |  |  |  |  | −0.006 | 97.4 | " | 9.26 |
| 7 |  |  | 60 | 1.50 | 40 | 1.00 |  |  |  |  | +0.002 | 100.9 | " | 9.26 |
| 8 |  |  | 70 | 1.75 | 30 | 0.75 |  |  |  |  | +0.003 | 101.3 | " | 9.25 |
| 9 |  |  | 80 | 2.00 | 20 | 0.50 | Sample wasn't run for corrosion* |  |  |  |  |  |  | 9.25 |
| 10 | 10 | 0.25 |  |  | 90 | 2.25 |  |  |  |  | +0.001 | 100.4 | " | 9.33 |
| 11 | 20 | 0.50 |  |  | 80 | 2.0 |  |  |  |  | 0.000 | 100.0 | " | 9.46 |
| 12 | 30 | 0.75 |  |  | 70 | 1.75 |  |  |  |  | +0.001 | 100.4 | " | 9.51 |
| 13 | 40 | 1.00 |  |  | 60 | 1.50 |  |  |  |  | −0.002 | 99.1 | " | 9.53 |
| 14 | 50 | 1.25 |  |  | 50 | 1.25 |  |  |  |  | 0.000 | 100.0 | " | 9.57 |
| 15 | 60 | 1.50 |  |  | 40 | 1.00 |  |  |  |  | +0.005 | 102.2 | " | 9.58 |
| 16 | 70 | 1.75 |  |  | 30 | 0.75 |  |  |  |  | −0.002 | 99.1 | " | 9.59 |
| 10-14A1 | 100 | 2.5 |  |  |  |  |  |  |  |  | −0.002 | 99.3 | 10-14A7 |  |
| 2 | 66 | 1.65 |  |  |  |  | 34 | 0.85 |  |  | −0.003 | 99.0 | " |  |
| 3 |  |  |  |  |  |  |  |  | 2.5 |  | −0.294 | 3.0 | " |  |
| 4 |  |  | 100 | 2.5 |  |  |  |  |  |  | −0.004 | 98.7 | " |  |
| 5 |  |  |  |  |  |  |  |  |  | 2.5 | −0.322 | −6.2 | " |  |
| 6 |  |  | 72 | 1.79 |  |  | 28 | 0.71 |  |  | −0.002 | 99.3 | " |  |
| 7 |  |  |  |  | 100 | 2.5 |  |  |  |  | −0.305 | 0.0 | " |  |
| 8 | 100 | 2.5 |  |  |  |  |  |  |  |  | 0.000 | 100.0 | " |  |
| 9 | 66 | 1.65 |  |  |  |  | 34 | 0.85 |  |  | 0.000 | 100.0 | " |  |
| 10 |  |  |  |  |  |  |  |  | 2.5 |  | −0.244 | 19.5 | " |  |
| 11 |  |  | 100 | 2.5 |  |  |  |  |  |  | 0.000 | 100.0 | " |  |
| 12 |  |  |  |  |  |  |  |  |  | 2.5 | −0.324 | −6.9 | " |  |
| 13 |  |  | 72 | 1.79 |  |  | 28 | 0.71 |  |  | −0.005 | 98.3 | " |  |
| 14 |  |  |  |  | 100 | 2.5 |  |  |  |  | −0.304 | 0.0 | " |  |
|  |  |  |  |  | Sodium Silicate |  |  |  |  |  |  |  |  |  |
| 2-25Cl | | | | | 100.0 | 2.5 | | | | | −0.305 | 0.0 | 2-25Cl | 6.60 |
| 2 | 5.0 | 0.125 | | | 95 | 2.375 | | | | | +0.001 | 100.3 | " | 9.75 |
| 3 | 4.8 | 0.12 | | | 91.3 | 2.283 | 3.9 | 0.0975 | | | +0.001 | 100.3 | " | 10.35 |
| 4 | 90.0 | 2.25 | | | 10.0 | 0.25 | | | | | +0.003 | 101.0 | " | 9.80 |
| 5 | 95.0 | 2.375 | | | 5.0 | 0.125 | | | | | 0.000 | 100.0 | " | 9.80 |
| 6 | 91.3 | 2.283 | | | 4.8 | 0.12 | 3.9 | 0.0975 | | | +0.001 | 100.3 | " | 9.70 |
| 3-Cl | | | | | 100.0 | 2.50 | | | | | −0.502 | 0.0 | " | 6.67 |
| 2 | 1.0 | 0.025 | | | 99.0 | 2.475 | | | | | −0.280 | 44.2 | " | 9.53 |
| 3 | 2.0 | 0.050 | | | 98.0 | 2.450 | | | | | −0.222 | 55.8 | " | 9.60 |
| 4 | 3.0 | 0.075 | | | 97.0 | 2.425 | | | | | −0.133 | 73.5 | " | 9.60 |
| 5 | 4.0 | 0.100 | | | 96.0 | 2.400 | | | | | +0.005 | 101.0 | " | 9.63 |

*Water bath would hold only fifteen samples.

Example No. 12
Corrosion of Deicing Solutions on Aluminum.

| Test No. | Ammonium Carbamate % of Solids | Ammonium Carbamate % of Solution | Urea % of Solids | Urea % of Solution | Sodium Silicate % of Solids | Sodium Silicate % of Solution | Percent Wt. Loss Loss (−) or Gain (+) | pH of Solution |
|---|---|---|---|---|---|---|---|---|
| 2-25C7 | 100.0 | 2.5 |  |  |  |  | +0.004 | 9.85 |
| 8 |  |  | 100.0 | 2.5 |  |  | +0.004 | 6.60 |
| 9 | 95.0 | 2.375 | 5.0 | 0.125 |  |  | −0.004 | 9.25 |
| 10 | 91.3 | 2.283 | 4.8 | 0.120 | 3.9 | 0.097 | 0.000 | 9.85 |

-continued

Example No. 12
Corrosion of Deicing Solutions on Aluminum.

| Test No. | Ammonium Carbamate | | Urea | | Sodium Silicate | | Percent Wt. Loss Loss (−) or Gain (+) | pH of Solution |
|---|---|---|---|---|---|---|---|---|
| | % of Solids | % of Solution | % of Solids | % of Solution | % of Solids | % of Solution | | |
| 11 | 75.0 | 1.875 | 25.0 | 0.625 | | | 0.000 | 9.75 |
| 12 | 25.0 | 0.625 | 75.0 | 1.875 | | | +0.004 | 9.75 |
| 13 | 5.0 | 0.125 | 95.0 | 2.375 | | | −0.004 | 9.75 |
| 14 | 4.8 | 0.120 | 91.3 | 2.283 | 3.9 | 0.097 | −0.0145 | 10.30 |

Corrosion of Steel in Concrete

EXAMPLE NOS. 13 THROUGH 22

Since much of the corrosion of steel occurs when deicing salts are used on paved surfaces and when the steel is imbedded in concrete, it was necessary to show that the deicing compositions of this invention do not corrode reinforcing steel. As discussed in the Prior Art, a modification of the method used by Gouda and Monfore was used to show the effect that the deicing compositions of this invention have on steel which is imbedded in concrete. The main modification of the method used by Gouda and Monfore was to use, for each separate test, a 2.5% solution of the deicing composition to be tested in making up each concrete test piece and to then use a 2.5% solution of the same deicing composition as the electrolyte into which the individual concrete test pieces were immersed.

In the tests which were run by Gouda and Monfore, the corrosive effect of calcium chloride on reinforcing steel was being studied along with the protection given by various corrosion inhibitors. Their tests were therefore made by adding various amounts of calcium chloride, with or without the corrosion inhibitors, to the concrete mix and to make the surrounding electrolyte from a saturated solution of calcium hydroxide in water. As a result of this procedure change, the difference in the potential between the calohalf cell and the test piece was higher for the Gouda and Monfore tests, but the difference between the potential of the test pieces that were not corroding and the test pieces that were corroding was greater in these tests. In the Gouda and Monfore tests, the noncorroding potential was generally above 550 mv and the corroding potential was below 400 mv down to 150 mv. For these tests, the noncorroding potential was 275 mv to 873 mv and the corroding potential of sodium chloride was a negative 108 mv down to a negative 298 mv.

The procedure for running these tests was as follows: A twenty foot length of ¼ inch reinforcing steel was cut into 4¼ inch lengths and then cleaned in a 1-1-1 trichloroethane solvent. The bottom ⅛ inch of each of the steel pieces was coated with paraffin wax. A ½ inch wide coating of wax was also banded around each of the steel pieces at a distance of 3½ from the bottom. This left a distance of 2⅞ inches or 7.3 cm between the wax coatings or an exposed surface area between the wax coatings of 7.3 cm×0.25 in.×2.54 cm/in.×=14.6 cm sq. For each test, the following concrete mix was made: Aggregate sand mixture, 755 grams; Type II cement, 120 grams; a 2.5% solution in water, of the deicer composition being tested, 125 grams. This concentration of the deicer composition, in the concrete mix, was equal to 2.6% of the weight of the added cement.

The concrete mix was then cast into a polystyrene container. The cylindrical container was 46 mm in diameter and 107 mm high and had 56 holes, which were 3/16 inches in diameter drilled in the side of each container and 13 holes in the bottom. One of the above test pieces was imbedded into each of the cylinders of concrete to a depth of about 3¼ inches, exposing 14.6 cm of each of these ¼ inch steel test pieces to the concrete and the contained and absorbed solutions.

The concrete was allowed to set for 24 hours before running the test. The exposed top of each test piece was filed to produce a shiny metallic surface for attaching an electrical connection.

After allowing the concrete to set for 24 hours, it was immersed in a water solution containing 2.5% of the deicing composition being tested. The test piece was immersed such that the top of the concrete was even with the top of the solution. The solution was contained in a 1500 ml beaker and in the same beaker was a platinum electrode which was connected to the negative side of two 1.5 volt batteries connected in series and the positive end of the batteries was connected through four variable resistances in series: two 10,000 ohm resistances, a 2,500 ohm resistance, and a 1000 ohm resistance. The opposite terminal of the resistances were in turn connected to the positive pole of a "Micronta" electronic ammeter. The negative pole of the ammeter, was connected to the top of the steel piece being tested for corrosion and was the means by which a positive charge was imposed upon the steel piece in order to make the steel test piece anodic.

Besides the concrete cylinder and the platinum electrode, there was also a saturated potassium chloride bridge immersed in the deicer solution being tested. This bridge was part of the circuit which connected the test solution to a saturated potassium chloride solution in an adjoining container into which a calomel electrode was also immersed. The calomel electrode was in turn connected to one terminal of a "Micronta" electronic voltmeter and the other terminal of the voltmeter was connected to the top of the steel test piece. This second circuit was the means of measuring the potential difference between the calomel electrode and the steel test piece when a positive charge was imposed on the steel test piece to produce a current of 0 to 100 ua/sq. cm flowing through the surface of the test piece.

A noncorroding solution allowed an anodic coating to build on the steel test piece and thus produced a high potential between the steel test piece and the calomel electrode. A corroding solution did not allow such a coating to build, but in the case of sodium chloride, produced a half cell that was more negative than was the calomel electrode.

The potential of each deicing composition was tested at a constant current density of 10 ua/sq. cm over a period of 60 minutes and then a new test piece was used to determine the potential as the current density was raised from 0 to 100 ua/sq. cm.

Noncorroding Effect of Ammonium Carbamate on Steel in Concrete

In Example No. 13, Test No. 5-12B1, at an increasing current density of 0 to 100 ua/sq. cm, and of 5-12B2, at a constant current density of 10 ua/sq. cm for 60 minutes, showed that in the presence of an ammonium carbamate solution the steel piece in concrete had a strong tendency to build a protective anodic coating.

Corroding Effect of Sodium Chloride on Steel in Concrete

In Example No. 14, Test No. 11-12B1, at an increasing current density of 0 to 100 ua/sq. cm, and Test No. 5-7B2, at a constant current density of 10 ua/sq. cm for 60 minutes, showed that in the presence of a sodium chloride solution, the steel test piece in the concrete had such a strong tendency to corrode, that in spite of applying sufficient positive voltage to the steel test piece to force a current of up to 100 ua/sq. cm, the steel piece developed a voltage, as compared to the calomel electrode, of minus 290 mv.

in Test 5-27B1, with an increasing current density, and in Test No. 5-27B2, with a constant current density, showed that while the voltage did not build as high as it did for straight ammonium carbamate, the deicing composition of ammonium carbamate plus urea would not corrode steel in concrete.

The pH of the water solution, containing 2.37% ammonium carbamate plus 0.13% urea, was 9.13.

Noncorroding Effect on Steel in Concrete, of Ammonium Carbamate Plus Sodium Hydroxide In Example No. 16, test Nos. 5-28B1 and 5-28B2 showed that, while the ammonium carbamate plus sodium hydroxide did not develop as much potential difference between the steel test pieces and the calomel electrode as the straight ammonium carbamate, this composition would not corrode steel in concrete. Another surprising thing, is the fact that a water solution containing 1.65% ammonium carbamate plus 0.85% sodium hydroxide had a pH of only 9.98. A water solution containing 0.85% sodium hydroxide alone would have a normality of 0.2125 and a pH of 13.3. The ammonium carbamate was a surprisingly good buffer for sodium hydroxide.

Example No. 13, Test No. 5-1281 and 2     Example No. 14, Test Nos. 11-12B1 and 5-7B2

MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE PIECE ARE IMMERSED IN A 2.5% DEICER IN WATER SOLUTION

| WHEN THE DEICER COMPOSITION IS AMMONIUM CARBAMATE | | | | WHEN THE DEICER COMPOSITION IS SODIUM CHLORIDE | | | |
|---|---|---|---|---|---|---|---|
| INCREASING CURRENT | | CONSTANT CURRENT DENSITY 10 ua/cm$^2$ | | INCREASING CURRENT DENSITY | | CONSTANT CURRENT DENSITY 10 ua/cm$^2$ | |
| ua/cm$^2$ | mv | MINUTES LAPSED TIME | mv | ua/cm$^2$ | mv | MINUTES LAPSED TIME | mv |
| 0.0 | −130 | 0 | −60 | 0.0 | −445 | 0 | −330 |
| 5.8 | 473 | 5 | 600 | 7.5 | −343 | 5 | −180 |
| 10.0 | 630 | 10 | 630 | 10 | −318 | 10 | −193 |
| 15.0 | 680 | 15 | 648 | 15 | −260 | 15 | −223 |
| 20.0 | 705 | 20 | 653 | 20 | −225 | 20 | −248 |
| 25.0 | 723 | 25 | 663 | 25 | −183 | 25 | −260 |
| 30.0 | 738 | 30 | 668 | 30 | −170 | 30 | −270 |
| 35.0 | 750 | 35 | 670 | 35 | −138 | 35 | −280 |
| 40.0 | 760 | 40 | 673 | 40 | −123 | 40 | −288 |
| 45.0 | 773 | 45 | 675 | 45 | −108 | 45 | −293 |
| 50.0 | 780 | 50 | 678 | 50 | −168 | 50 | −295 |
| 55.0 | 795 | 55 | 680 | 55 | −225 | 55 | −298 |
| 60.0 | 803 | 60 | 680 | 60 | −253 | 60 | −298 |
| 65.0 | 810 | | | 65 | −253 | | |
| 70.0 | 820 | | | 70 | −253 | | |
| 75.0 | 820 | | | 75 | −260 | | |
| 80.0 | 838 | | | 80 | −265 | | |
| 85.0 | 845 | | | 85 | −278 | | |
| 90.0 | 853 | | | 90 | −285 | | |
| 95.0 | 858 | | | 95 | −290 | | |
| 100.0 | 873 | | | 100 | −285 | | |

Noncorroding Effect of Ammonium Carbamate Plus Urea on Steel in Concrete

In Example No. 15, the increasing voltages of the steel test pieces, as compared to the calomel electrode,

| Example No. 15 Test Nos. 5-27B1 and 2 | | | | Example No. 16, Test Nos. 5-28B1 & 2 | | | |
|---|---|---|---|---|---|---|---|
| MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE TEST PIECE ARE IMMERSED IN A 2.5% DEICER IN WATER SOLUTION | | | | | | | |
| WHEN THE DEICER COMPOSITION IS 94.8% AMMONIUM CARBAMATE AND 5.2% UREA | | | | WHEN THE DEICER COMPOSITION IS 66.1% AMMONIUM CARBAMATE AND 33.9% SODIUM HYDROXIDE | | | |
| INCREASING CURRENT DENSITY | | CONSTANT CURRENT DENSITY 10 ua/cm$^2$ | | INCREASING CURRENT DENSITY | | CONSTANT CURRENT DENSITY 10 ua/cm$^2$ | |
| ua/cm$^2$ | mv | MINUTES LAPSED TIME | mv | ua/cm$^2$ | mv | MINUTES LAPSED TIME | mv |
| 0.0 | −128 | 0 | −108 | 0.0 | −173 | 0 | −158 |
| 8.6 | 488 | 5 | 525 | 5 | 350 | 5 | 450 |
| 10 | 560 | 10 | 553 | 10 | 478 | 10 | 483 |
| 15 | 618 | 15 | 568 | 15 | 525 | 15 | 498 |
| 20 | 645 | 20 | 575 | 20 | 548 | 20 | 503 |
| 25 | 663 | 25 | 583 | 25 | 558 | 25 | 505 |
| 30 | 670 | 30 | 590 | 30 | 568 | 30 | 508 |
| 35 | 645 | 35 | 595 | 35 | 575 | 35 | 508 |
| 40 | 640 | 40 | 598 | 40 | 580 | 40 | 510 |
| 45 | 630 | 45 | 600 | 45 | 585 | 45 | 515 |
| 50 | 630 | 50 | 600 | 50 | 593 | 50 | 515 |
| 55 | 635 | 55 | 603 | 55 | 598 | 55 | 515 |
| 60 | 645 | 60 | 603 | 60 | 603 | 60 | 515 |
| 65 | 655 | | | 65 | 605 | | |
| 70 | 665 | | | 70 | 613 | | |
| 75 | 675 | | | 75 | 618 | | |
| 80 | 680 | | | 80 | 623 | | |
| 85 | 685 | | | 85 | 625 | | |
| 90 | 693 | | | 90 | 628 | | |
| 95 | 700 | | | 95 | 630 | | |
| 100 | 705 | | | 100 | 635 | | |

Noncorroding Effect, on Steel in Concrete, of Ammonium Carbamate, Plus Urea Plus Sodium Hydroxide In Example No. 17, Test No. 6-4B1, at increasing current density, and Test No. 6-4B2, at constant current density, showed that a solution containing 1.59% ammonium carbamate plus 0.82% sodium hydroxide plus 0.09% urea does not corrode steel in concrete. The pH of this solution was 9.97 and again showed the strong buffering effect that ammonium carbamate has on sodium hydroxide.

Noncorroding Effect, on Steel in Concrete, of Urea

In Example No. 18, Test No. 5-15B1, at increasing current densities, and Test No. 5-15B2, at a constant current density, showed that steel in concrete is not corroded by urea. The pH of this solution was 7.19.

| Example No. 17, Test Nos. 6-4B1 & 2 | | | | Example No. 18, Test Nos. 5-15B1 & 2 | | | |
|---|---|---|---|---|---|---|---|
| MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE TEST PIECE ARE IMMERSED IN A 2.5% DEICER IN WATER SOLUTION | | | | | | | |
| WHEN THE DEICER COMPOSITION IS 63.6% AMMONIUM CARBAMATE 3.6% UREA 32.8% SODIUM HYDROXIDE | | | | WHEN THE DEICER COMPOSITION IS UREA | | | |
| INCREASING CURRENT DENSITY | | CONSTANT CURRENT DENSITY 10 ua/cm$^2$ | | INCREASING CURRENT DENSITY | | CONSTANT CURRENT DENSITY 10 ua/cm$^2$ | |
| ua/cm$^2$ | mv | MINUTES LAPSED TIME | mv | ua/cm$^2$ | mv | MINUTES LAPSED TIME | mv |
| 0 | −148 | 0 | −183 | 0 | −195 | 0 | −183 |
| 5.5 | 393 | 5 | 395 | 5.5 | 345 | 5 | 475 |
| 10 | 480 | 10 | 413 | 10 | 518 | 10 | 520 |
| 15 | 508 | 15 | 415 | 15 | 590 | 15 | 533 |
| 20 | 530 | 20 | 418 | 20 | 623 | 20 | 548 |
| 25 | 535 | 25 | 418 | 25 | 645 | 25 | 553 |
| 30 | 533 | 30 | 413 | 30 | 655 | 30 | 558 |
| 35 | 500 | 35 | 410 | 35 | 673 | 35 | 563 |
| 40 | 460 | 40 | 408 | 40 | 683 | 40 | 565 |
| 45 | 453 | 45 | 405 | 45 | 693 | 45 | 570 |
| 50 | 450 | 50 | 405 | 50 | 705 | 50 | 573 |
| 55 | 450 | 55 | 403 | 55 | 715 | 55 | 573 |
| 60 | 450 | 60 | 403 | 60 | 725 | 60 | 573 |
| 65 | 453 | | | 65 | 735 | | |

-continued

| Example No. 17, Test Nos. 6-4B1 & 2 | | | | Example No. 18, Test Nos. 5-15B1 & 2 | | | |
|---|---|---|---|---|---|---|---|
| MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE TEST PIECE ARE IMMERSED IN A 2.5% DEICER IN WATER SOLUTION ||||||||
| WHEN THE DEICER COMPOSITION IS 63.6% AMMONIUM CARBAMATE 3.6% UREA 32.8% SODIUM HYDROXIDE | | | | WHEN THE DEICER COMPOSITION IS UREA | | | |
| INCREASING CURRENT DENSITY | | CONSTANT CURRENT DENSITY 10 ua/cm² MINUTES LAPSED | | INCREASING CURRENT DENSITY | | CONSTANT CURRENT DENSITY 10 ua/cm² MINUTES LAPSED | |
| ua/cm² | mv | TIME | mv | ua/cm² | mv | TIME | mv |
| 70 | 455 | | | 70 | 745 | | |
| 75 | 455 | | | 75 | 755 | | |
| 80 | 458 | | | 80 | 765 | | |
| 85 | 458 | | | 85 | 775 | | |
| 90 | 460 | | | 90 | 783 | | |
| 96 | 460 | | | 95 | 793 | | |
| 100 | 463 | | | 100 | 800 | | |

Noncorroding Effect, on Steel in Concrete, of Ammonium Carbonate current density, showed that steel in concrete is not corroded by ammonium carbonate plus urea.

| Example No. 19, Test Nos. 5-21B1 & 2 | | | | Example No. 20, Test Nos. 5-22B1 & 2. | | | |
|---|---|---|---|---|---|---|---|
| MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE TEST PIECE ARE IMMERSED IN A 2.5% DEICER IN WATER SOLUTION ||||||||
| WHEN THE DEICER COMPOSITION IS AMMONIUM CARBONATE | | | | WHEN THE DEICER COMPOSITION IS 94.4% AMMONIUM CARBONATE AND 5.6% UREA | | | |
| INCREASING CURRENT DENSITY | | CONSTANT CURRENT DENSITY 10 ua/cm² MINUTES LAPSED | | INCREASING CURRENT DENSITY | | CONSTANT CURRENT DENSITY 10 ua/cm² MINUTES LAPSED | |
| ua/cm² | mv | TIME | mv | ua/cm² | mv | TIME | mv |
| 0 | −120 | 0 | −138 | 0 | −183 | 0 | −225 |
| 5 | 473 | 5 | 555 | 5.5 | 368 | 5 | 415 |
| 10 | 598 | 10 | 590 | 10 | 555 | 10 | 483 |
| 15 | 643 | 15 | 613 | 15 | 615 | 15 | 525 |
| 20 | 668 | 20 | 623 | 20 | 648 | 20 | 548 |
| 25 | 683 | 25 | 630 | 25 | 668 | 25 | 563 |
| 30 | 698 | 30 | 635 | 30 | 680 | 30 | 570 |
| 35 | 708 | 35 | 640 | 35 | 695 | 35 | 580 |
| 40 | 725 | 40 | 645 | 40 | 705 | 40 | 583 |
| 45 | 738 | 45 | 648 | 45 | 718 | 45 | 578 |
| 50 | 748 | 50 | 650 | 50 | 728 | 50 | 575 |
| 55 | 758 | 55 | 653 | 55 | 733 | 55 | 575 |
| 60 | 770 | 60 | 653 | 60 | 728 | 60 | 575 |
| 65 | 778 | | | 65 | 708 | | |
| 70 | 793 | | | 70 | 713 | | |
| 75 | 803 | | | 75 | 713 | | |
| 80 | 810 | | | 80 | 718 | | |
| 85 | 820 | | | 85 | 723 | | |
| 90 | 825 | | | 90 | 728 | | |
| 95 | 833 | | | 95 | 733 | | |
| 100 | 843 | | | 100 | 743 | | |

In Example No. 19, Test No. 5-21B1 and 5-21B2, at increasing and constant current densities, respectively, showed that ammonium carbonate has about the same properties as does ammonium carbamate in not corroding steel in concrete. The pH of a 2.5% solution of ammonium carbonate in water is 9.0.

Noncorroding Effect, on Steel in Concrete, of Ammonium Carbonate Plus Urea

In Example No. 20, Test No. 5-22B1, at increasing current densities, and Test No. 5-22B2, at a constant current density, showed that steel in concrete is not corroded by ammonium carbonate plus urea.

Noncorroding Effect, on Steel in Concrete, of Ammonium Bicarbonate

In Example No. 21, Test No. 17C1, at increasing current densities, and Test No. 1-13C1, at a constant current density, showed that ammonium bicarbonate does not corrode steel in concrete, but it does not appear to build and hold an anodic coating on the steel as strongly as does ammonium carbamate or ammonium carbonate. The pH of a 2.5% solution in water was 8.2.

Noncorroding Effect, on Steel in Concrete, of Ammonium Bicarbonate Plus Urea

In Example No. 22, Test No. 1-22C1, at increasing current densities, and Test No. 1-22C2, at a constant current density, showed that ammonium bicarbonate plus urea does not corrode steel in concrete; although, of all the noncorroding compositions tested, this composition appeared to have the least tendency to build and hold an anodic coating on the steel. The pH of the water solution, containing 2.37% ammonium bicarbonate plus 0.13% urea was 8.25.

and the ice and made it easy to mechanically remove the snow and ice from the pavement.

A Method of Using Ammonium Carbamate Plus Urea to Facilitate the Removal of Snow and Ice from a Paved Surface Eleven grams of prilled urea was mixed with 189 grams of ammonium carbamate and the mixture was then applied to some snow and ice. The results were basically the same as when straight ammonium carbamate was used for this purpose.

A Method of Using an Ammonium Carbamate Solution

| Example No. 21, Test Nos. 1-7C1 & 1-13C1 | | | | Example No. 22, Test Nos. 1-22C1 & 2 | | | |
|---|---|---|---|---|---|---|---|
| MILLIVOLTS OF POTENTIAL BETWEEN STEEL REBAR TEST PIECE THAT HAS BEEN MADE ANODIC AND A CALOMEL ELECTRODE WHEN THE TEST PIECE IS IMBEDDED IN CONCRETE MADE WITH A 2.5% DEICER IN WATER SOLUTION AND THE CONCRETE AND THE TEST PIECE ARE IMMERSED IN A 2.5% DEICER IN WATER SOLUTION | | | | | | | |
| WHEN THE DEICER COMPOSITION IS AMMONIUM BICARBONATE | | | | WHEN THE DEICER COMPOSITION IS 94.8% AMMONIUM BICARBONATE 5.2% UREA | | | |
| | | CONSTANT CURRENT DENSITY 10 ua/cm$^2$ | | | | CONSTANT CURRENT DENSITY 10 ua/cm$^2$ | |
| INCREASING CURRENT DENSITY | | MINUTES LAPSED | | INCREASING CURRENT DENSITY | | MINUTES LAPSED | |
| ua/cm$^2$ | mv | TIME | mv | ua/cm$^2$ | mv | TIME | mv |
| 0 | −85 | 0 | −93 | 0 | −83 | 0 | −83 |
| 5.8 | 528 | 5 | 598 | 5.5 | 528 | 5 | 268 |
| 10 | 608 | 10 | 618 | 10 | 608 | 10 | 265 |
| 15 | 643 | 15 | 623 | 15 | 640 | 15 | 265 |
| 20 | 668 | 20 | 628 | 20 | 653 | 20 | 268 |
| 25 | 683 | 25 | 630 | 25 | 668 | 25 | 268 |
| 30 | 698 | 30 | 633 | 30 | 673 | 30 | 270 |
| 35 | 715 | 35 | 633 | 35 | 680 | 35 | 270 |
| 40 | 725 | 40 | 630 | 40 | 683 | 40 | 273 |
| 45 | 740 | 45 | 628 | 45 | 685 | 45 | 273 |
| 50 | 748 | 50 | 623 | 50 | 688 | 50 | 275 |
| 55 | 755 | 55 | 620 | 55 | 675 | 55 | 275 |
| 60 | 755 | 60 | 618 | 60 | 620 | 60 | 275 |
| 65 | 753 | | | 65 | 528 | | |
| 70 | 753 | | | 70 | 500 | | |
| 75 | 753 | | | 75 | 480 | | |
| 80 | 750 | | | 80 | 468 | | |
| 85 | 745 | | | 85 | 460 | | |
| 90 | 730 | | | 90 | 448 | | |
| 95 | 685 | | | 95 | 433 | | |
| 100 | 603 | | | 100 | 420 | | |

A Method of Using Ammonium Carbamate to Facilitate the Removal of Snow and Ice from a Paved Surface A substantial quantity of ammonium carbamate was produced by reacting anhydrous ammonia with carbon dioxide in a thirty inch length of four inch ABS plastic pipe. The pipe had some plastic lifters glued to the inside. Before the reaction, a batch quantity of pulverized dry ice was fed into the pipe. The pipe was then set on some rolls and rotated while a controlled quantity of anhydrous ammonia was fed into a small opening in one end of the pipe. The ammonia was fed until all of the dry ice had been converted into ammonium carbamate. Approximately five to ten pounds of granular ammonium carbamate was produced by this method. The ammonium carbamate was kept in large glass containers and stored in a refrigerator.

A quantity of this ammonium carbamate was then applied to a concrete porch to remove the snow and ice on the pavement. It was observed that the ammonium carbamate penetrated the snow and ice quite readily to produce a deicing solution which spread out under the snow and ice, broke the bond between the pavement to Flush Snow from a Metal Surface A forty percent solution of ammonium carbamate was made up by dissolving 40 grams of ammonium carbamate into 60 grams of distilled water. This 100 grams of solution was then put into a trigger sprayer and some snow was flushed from a metal surface by spraying the snow off with this solution from the trigger sprayer.

A forty percent solution of propylene glycol was made up by combining 40 grams of propylene glycol with 60 grams of distilled water. This 100 grams of glycol solution was then sprayed onto some snow on a metal plate with basically the same results as when using the forty percent solution of ammonium carbamate.

A Method of Using a Solution of Ammonium Carbamate Plus Urea to Flush Snow from a Metal Surface.

A solution of ammonium carbamate plus urea was made up by dissolving 39 grams of ammonium carbamate plus 2.5 grams of urea into 58.5 grams of distilled water. This solution was then sprayed from a trigger sprayer to flush some snow from a metal surface. The results obtained were comparable with the results when using either the forty percent soluton of straight ammonium carbamate or the forty percent solution of propylene glycol.

I claim:

1. A deicing composition consisting essentially of ammonium carbamate and urea in granular form in the range of proportions by weight of 99.5% to 4% ammonium carbamate and 0.5% to 96% urea.

2. The composition of claim 1, in which the composition is in granular form with particles in the range of 1/20"-¼".

3. The composition of claim 1, in which the composition is in granular form with particles in the range of twenty mesh to ¼".

4. A deicing composition consisting essentially of ammonium carbamate and urea in granular form, in the ratio, by weight, of approximately 95% ammonium carbamate and 5% urea.

5. A deicing composition consisting essentially of ammonium carbamate and either sodium hydroxide, sodium orthosilicate or potassium hydroxide.

6. The composition of claim 5 in a water solution.

7. The composition of claim 5, in which the composition is in granular form with particles in the range of 1/20" to ¼".

8. A deicing composition consisting essentially of ammonium carbamate and either sodium hydroxide or sodium orthosilicate in the proportions of one mole of ammonium carbamate to one mole of sodium hydroxide or sodium orthosilicate.

9. A deicing composition consisting essentially of ammonium carbamate, sodium hydroxide and urea.

10. A deicing composition consisting essentially of ammonium carbamate, potassium hydroxide and urea.

11. A process for melting ice comprising applying an aqueous solution consisting essentially of water and ammonium carbamate at a concentration of about 40% by weight.

* * * * *